(12) United States Patent
Katoh et al.

(10) Patent No.: US 6,336,538 B1
(45) Date of Patent: Jan. 8, 2002

(54) FLUID COUPLING

(75) Inventors: Hirofumi Katoh; Kenji Ohhara; Yasuo Fujita, all of Kanagawa (JP)

(73) Assignee: Unisia Jecs Corporation, Kanagawa (JP)

(*) Notice: Subject to any disclaimer, the term of this patent is extended or adjusted under 35 U.S.C. 154(b) by 0 days.

(21) Appl. No.: 09/598,761

(22) Filed: Jun. 22, 2000

(30) Foreign Application Priority Data

Jun. 25, 1999 (JP) ............................................ 11-180740

(51) Int. Cl.[7] ............................................. F16D 35/02
(52) U.S. Cl. ........................ 192/58.682; 192/58.68; 192/82 T
(58) Field of Search ...................... 192/58.682, 58.681, 192/58.68, 58.63, 82 T (56) References Cited

U.S. PATENT DOCUMENTS 5,237,965 A * 8/1993 Harima ................... 192/58.682
5,535,868 A * 7/1996 Hagiwara ............. 192/82 T X
5,803,221 A * 9/1998 Kawada et al. ..... 192/58.682 X
6,021,747 A * 2/2000 Gee et al. ................ 123/41.12

FOREIGN PATENT DOCUMENTS

| JP | 57-204491 | 6/1981 |
| JP | 59-128993 | 8/1984 |
| JP | 1-83925 | 6/1989 |
| JP | 3-077825 | 8/1991 |

* cited by examiner

Primary Examiner—Rodney H. Bonck
(74) Attorney, Agent, or Firm—Sughrue Mion, PLLC

(57) ABSTRACT

A fluid coupling includes an operation plate for defining storage and working chambers in a housing and having a communicating hole for fluid communication between the two, a driven wheel arranged adjacent to the operation plate, a torque-transfer part for transmitting torque of a rotor to the housing, and a valve mechanism for opening and closing the communicating hole. An auxiliary chamber, which is arranged in the driven wheel, brings working fluid out of the communicating hole to the torque-transfer part. A positioning mechanism ensures circumferential positioning of the operation plate and the driven wheel.

6 Claims, 7 Drawing Sheets

FLUID COUPLING

BACKGROUND OF THE INVENTION

The present invention relates to fluid couplings for use, for example, in cooling fans for automotive internal combustion engines.

A fluid coupling for use in cooling fans for automotive internal combustion engines is disclosed, for example, in JP-U 57-204491 and JP-U 3-77825. The fluid coupling includes a housing relatively rotatably supported to a drive shaft driven by an engine crankshaft, an operation or partition plate for defining a storage chamber and a working chamber in the housing and having a communicating hole for fluid communication between the two, a rotor disposed in the working chamber and fixed to the drive shaft, a labyrinth torque-transfer part disposed at the outer periphery of the rotor and for transmitting torque of the rotor to the housing, and a valve mechanism for opening and closing the communicating hole of the operation plate in accordance with an ambient temperature of the housing to adjust a flow rate of working fluid flowing from the storage chamber to the working chamber.

The housing includes a main body supported to the drive shaft and a cover engaged with a front face of the main body. The cover has at the inner periphery thereof a circular recess for defining the storage chamber, and at the outer periphery of the recess a ring-shaped flange with a working-fluid return passage.

The operation plate is substantially circularly formed out of a metal plate, the outer periphery of which is joined to the inner periphery of the flange of the cover in a caulked way with an opening of the recess of the cover closed, which provides caulked-joint portions.

The torque-transfer part includes a plurality of concentric annular protrusions arranged at the outer periphery of the caulked-joint portions of the flange of the cover, and a plurality of concentric annular protrusions arranged with the rotor and engaged with grooves between the adjacent protrusions of the caulked-joint portions of the flange.

The fluid coupling is constructed as follows. When an ambient temperature of the housing is low, the communicating hole of the operation plate is closed through the valve mechanism to interrupt inflow of working fluid from the storage chamber to the working chamber. With this, supply of working fluid to the torque-transfer part is restricted to lower the amount of torque transmitted from the rotor to the housing, obtaining stop or low-speed rotation of a cooling fan. On the other hand, when an ambient temperature of the housing is high, the communicating hole of the operation plate is opened through the valve mechanism to produce large inflow of working fluid from the storage chamber to the working chamber and the torque-transfer part. With this, the amount of torque transmitted from the rotor to the housing is increased to produce high-speed rotation of the cooling fan, obtaining full cooling of an engine radiator.

With the fluid coupling, however, since the torque-transfer part is formed by engaging the protrusions of the cover of the housing with the protrusions of the rotor, its position of formation is restricted to the outer periphery of the cover. Noted that it is difficult to form the protrusions of the cover of the housing inside the outer peripheral edge of the operation plate, since the operation plate is mounted at the inner periphery of the cover.

Moreover, since the torque-transfer part is formed outside the inner peripheral surface of the storage chamber, i.e. the storage chamber is located upstream of the torque-transfer part, the torque-transfer part is immersed in working fluid accumulated in the storage chamber even during engine or rotor stop. This produces so-called accompanying rotation of the cooling fan upon start of engine operation.

Another fluid coupling which can prevent accompanying rotation of the cooling fan is disclosed, for example, in JP-U 59-128933 and JP-U 1-83925. This fluid coupling has a working-fluid accumulation chamber arranged at the outer periphery of the torque-transfer part. During engine stop, working fluid is accumulated in the working-fluid accumulation chamber to discharge working fluid from the torque-transfer part, thus preventing accompanying rotation of the cooling fan.

With another fluid coupling, however, since working fluid flows into the working-fluid accumulation chamber during engine operation, a residence time of working fluid is shorter in the torque-transfer part, resulting in a technical disadvantage of lowered utilization efficiency of working fluid.

A further fluid coupling is proposed which can overcome the above technical disadvantage. This fluid coupling includes in the working chamber a driven wheel arranged opposite to the rotor so as to define the torque-transfer part between the driven wheel and the rotor. A working-fluid passage is arranged with the driven wheel to bring working fluid out of the communicating hole of the operation plate to the torque-transfer part. This structure allows the torque-transfer part to be arranged inside the outer periphery of the operation plate, and not at the outer periphery thereof.

However, this fluid coupling produces difficulty of efficient and stable supply of working fluid to the torque-transfer part due to the magnitude of a flow resistance of the working-fluid passage of the driven wheel.

SUMMARY OF THE INVENTION

It is, therefore, an object of the present invention to provide a fluid coupling which contributes to efficient and stable supply of working fluid to the torque-transfer part and to accurate positioning and easy assemblage of the apparatus.

One aspect of the present invention lies in providing a fluid coupling, comprising:

a drive shaft;

a housing relatively rotatably supported to said drive shaft;

an operation plate arranged in said housing, said operation plate defining first and second chambers, said operation plate having a communicating hole for fluid communication between said first and second chambers;

a driven wheel arranged adjacent to said operation plate;

a rotor arranged in said second chamber, said rotor being fixed to said drive shaft;

a torque-transfer part interposed between outer peripheries of said driven wheel and said rotor, said torque-transfer part transmitting torque of said rotor to said housing;

a valve mechanism which opens and closes said communicating hole of said operation plate in accordance with an ambient temperature of said housing, said valve mechanism adjusting a flow rate of working fluid flowing from said first chamber to said second chamber;

a passage formed through said driven wheel, said passage bringing working fluid out of said communicating hole to said torque-transfer part;

an auxiliary chamber arranged between said driven wheel and said operation plate, said auxiliary chamber bringing working fluid out of said communicating hole to said passage; and a positioning mechanism arranged between said operation plate and said driven wheel, said positioning mechanism ensuring circumferential positioning of said operation plate and said driven wheel.

Another aspect of the present invention lies in providing a fluid coupling, comprising:

a drive shaft;

a housing relatively rotatably supported to said drive shaft;

an operation plate arranged in said housing, said operation plate defining first and second chambers, said operation plate having a communicating hole for fluid communication between said first and second chambers;

a driven wheel arranged adjacent to said operation plate;

a rotor arranged in said second chamber, said rotor being fixed to said drive shaft;

a torque-transfer part interposed between outer peripheries of said driven wheel and said rotor, said torque-transfer part transmitting torque of said rotor to said housing;

a valve mechanism which opens and closes said communicating hole of said operation plate in accordance with an ambient temperature of said housing, said valve mechanism adjusting a flow rate of working fluid flowing from said first chamber to said second chamber;

a passage formed through said driven wheel, said passage bringing working fluid out of said communicating hole to said torque-transfer part;

means, arranged between said driven wheel and said operation plate, for bringing working fluid out of said communicating hole to said passage; and means, arranged between said operation plate and said driven wheel, for ensuring circumferential positioning of said operation plate and said driven wheel.

DETAILED DESCRIPTION OF THE INVENTION

Figure 1:
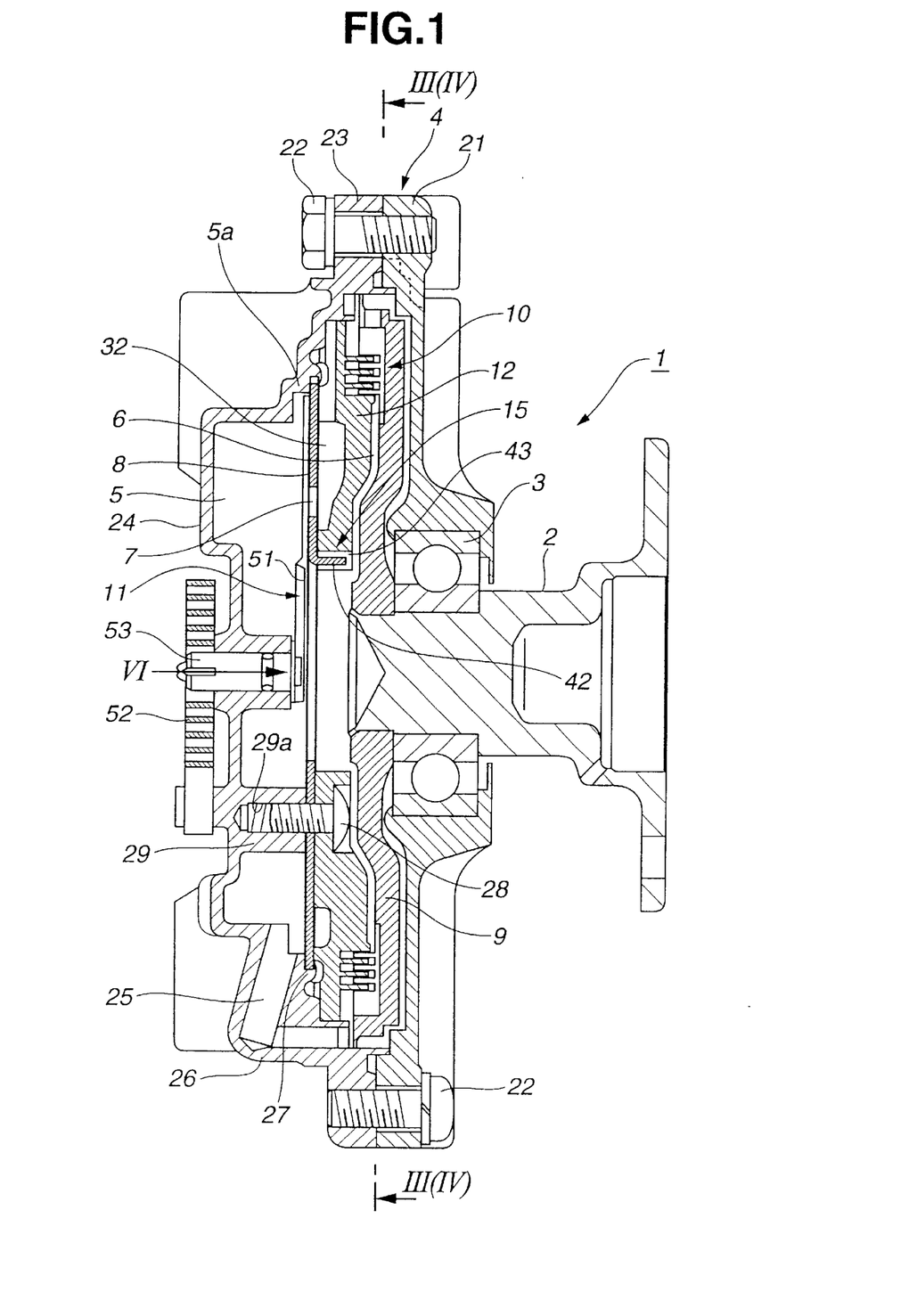
FIG. 1 is a longitudinal section showing an embodiment of a fluid coupling according to the present invention.
Figure 2:
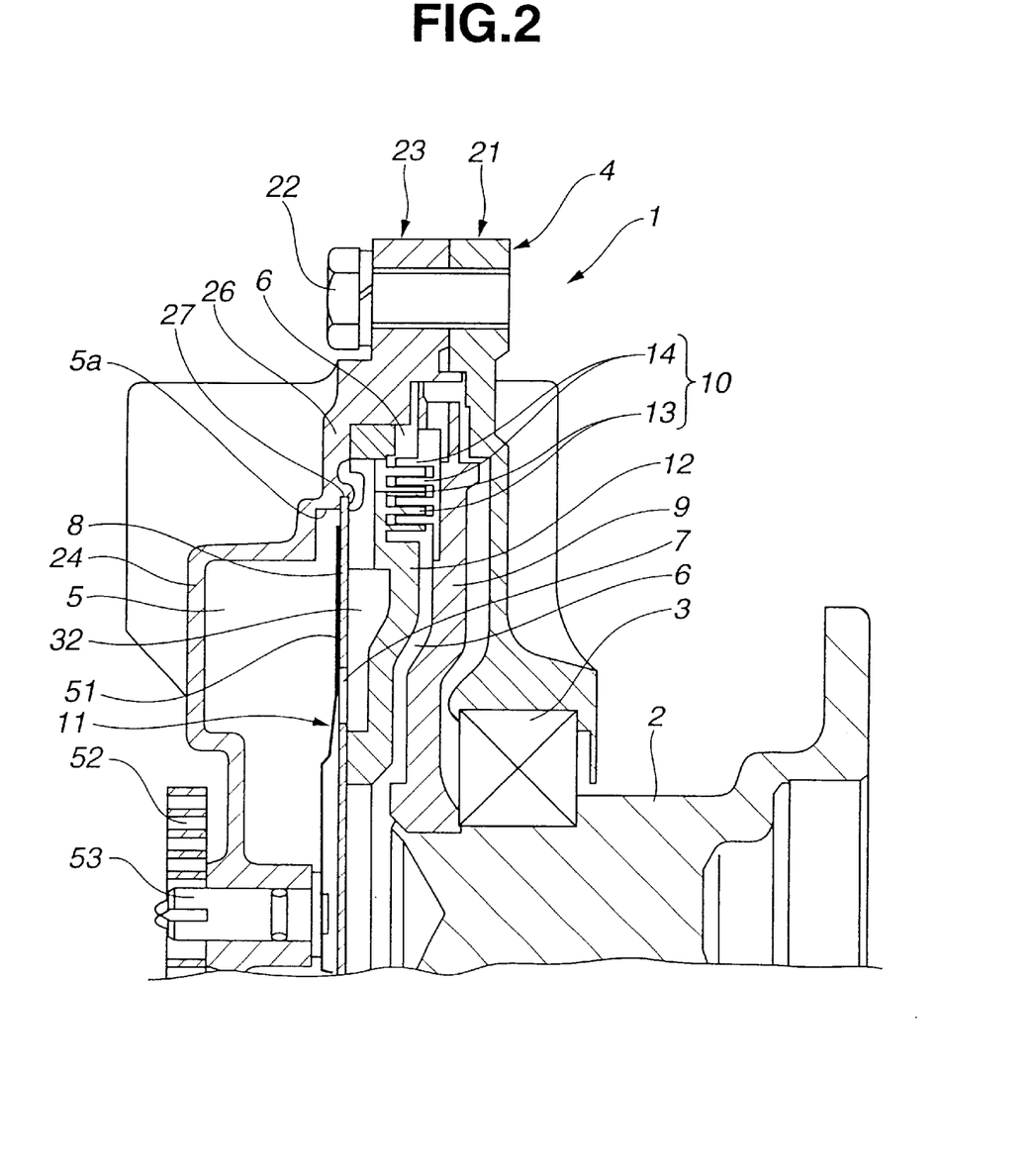
FIG. 2 is an enlarged fragmentary view of FIG. 1.

Referring to FIGS. 1–7, there is shown a fluid coupling embodying the present invention. Referring to FIGS. 1–2, a fluid coupling 1 includes a housing 4 relatively rotatably supported, through a bearing 3, to a drive shaft 2 driven by an engine crankshaft, not shown, an operation plate 8 for defining a storage or first chamber 5 and a working or second chamber 6 in the housing 4 and having a communicating hole 7 for fluid communication between the two, a driven wheel 12 adjacently disposed outside the operation plate 8 and fixed to the housing 4, a rotor 9 disposed in the working chamber 6 and fixed to an end of the drive shaft 2, a labyrinth torque-transfer part 10 disposed at the outer periphery of the driven wheel 12 and the rotor 9 and for transmitting torque of the rotor 9 to the housing 4, a valve mechanism 11 for opening and closing the communicating hole 7 of the operation plate 8 in accordance with an ambient temperature of the housing 4 to adjust a flow rate of working fluid flowing from the storage chamber 5 to the working chamber 6, and a positioning mechanism 15 for ensuring circumferential positioning of the operation plate 8 and the driven wheel 12 when adjacently connecting the two in the housing 4.

As best seen in FIG. 2, the torque-transfer part 10 includes a plurality of concentric annular protrusions 13 arranged at the outer periphery of the driven wheel 12 in the working chamber 6, and a plurality of concentric annular protrusions 14 arranged with the rotor 9 and engaged with labyrinth grooves between the adjacent protrusions 13 of the driven wheel 12. Moreover, at least part of the torque-transfer part 10 is located inside an inner peripheral surface 5a of the storage chamber 5, and all the protrusions 13, 14 are of substantially the same height.

The housing 4 includes a main body 21 supported to the drive shaft 2 through the bearing 3 and a cover 23 engaged with a front face of the main body 21 through bolts 22. The cover 23 has at the inner periphery thereof a circular recess 24 for defining the storage chamber 5, and at the outer periphery of the recess 24 a ring-shaped flange 26 with a working-fluid return passage 25. The operation plate 8 is mounted to the flange 26 with the recess 24 closed.

Figure 3:
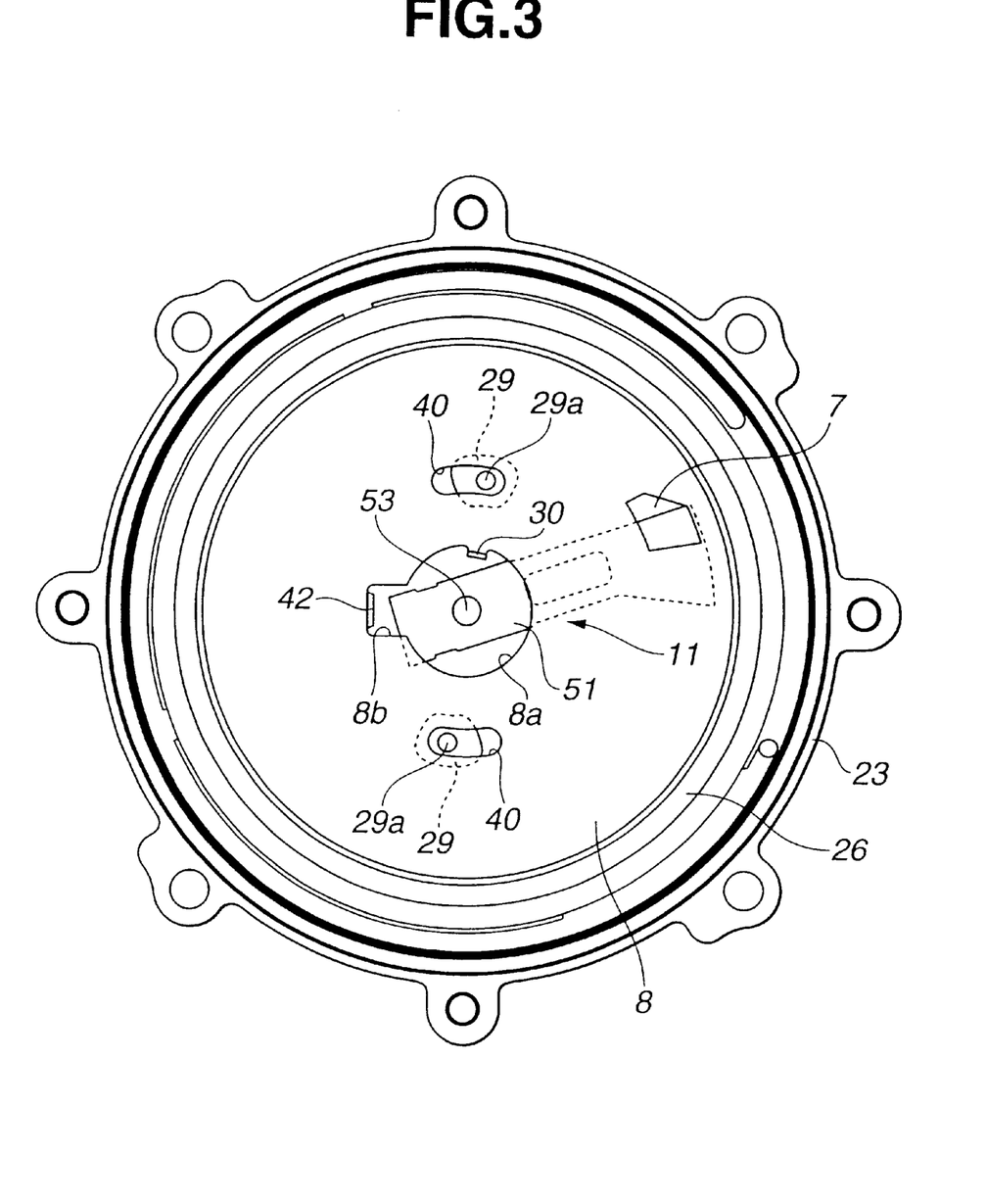
FIG. 3 is a cross section showing an operation plate, with a driven wheel removed, as viewed from the line III—III in FIG. 1

Referring to FIGS. 1 and 3, a pair of prism-shaped bosses 29 of roughly fan-shaped cross section is arranged on the inner surface and at the inner periphery of the cover 23 to be roughly symmetric with respect to a center of the cover 23. An upper end of each boss 29 is formed with a female-screw hole 29a with which a screw 28 is meshed.

Referring to FIGS. 2–3, the operation plate 8 is substantially circularly formed out of a metal plate, the outer periphery of which is joined to the flange 26 of the cover 23 in a caulked way with an opening of the recess 24 of the cover 23 closed, which provides four circumferentially equidistant caulked-joint portions 27. A pair of circular slots 40 is formed in the operation plate 8 at the inner periphery to secure a flexibility of circumferential positioning through the screws 28 before caulked joint of the operation plate 8 to the cover 23.

A valve plate 51 of the valve mechanism 11 is disposed adjacent to one side of the operation plate 8 or a side thereof facing the storage chamber 5 so as to open and close the communicating hole 7 of the operation plate 8. A stopper 30 is arranged in a predefined edge position of a circular small-diameter through hole 8a formed in a center of the operation plate 8, and extends in the direction of one side of the operation plate 8, restricting a maximum closed position of the valve plate 51.

As best seen in FIG. 1, the valve mechanism 11 is disposed adjacent to a surface of the operation plate 8, and includes a valve plate 51 for opening and closing the communicating hole 7 of the operation plate 8 and a spiral bimetal 52 for driving the valve plate 51. The bimetal 52 is mounted in a center of a front face of the cover 23, and is connected to the valve plate 51 through a rotation shaft 53. When an ambient temperature of the housing 4 rises, the bimetal 52 extends to rotate the valve plate 51 in one direction, opening the communicating hole 7. On the other hand, when an ambient temperature drops, the bimetal 52 contracts to rotate the valve plate 51 in another direction, closing the communicating hole 7.

Figure 4:
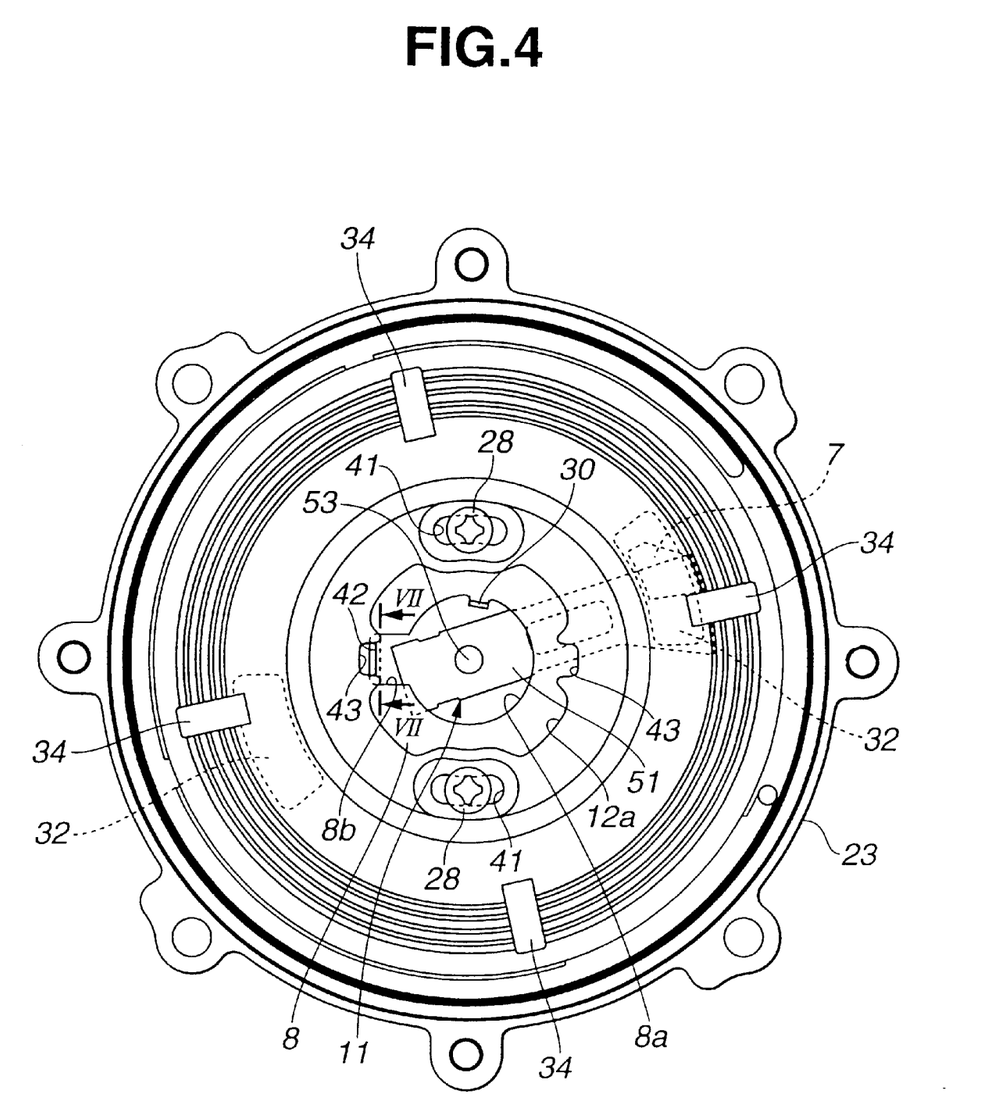
FIG. 4 is a view similar to FIG. 3, showing the driven wheel as viewed from the line IV—IV in FIG. 1.

Referring to FIG. 4, the driven wheel 12, disposed adjacent to another side of the operation plate 8 or a side thereof facing the working chamber 6, is mounted to the cover 23 through the bosses 29 and the screws 28.

Figure 5:
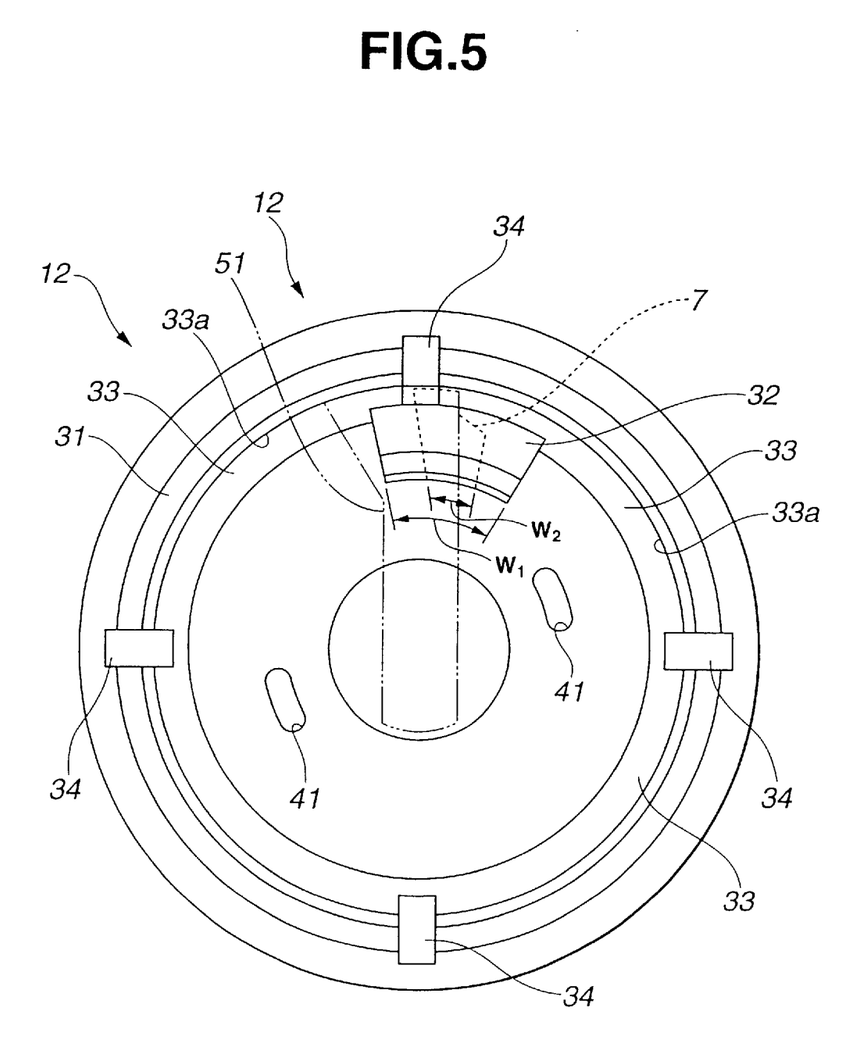
FIG. 5 is a view similar to FIG. 4, showing the driven wheel as viewed from the operation plate.

Referring to FIG. 5, the driven wheel 12 comprises in one side adjacent to the operation plate 8 a recess 31 which receives the caulked-joint portions 27, a roughly fan-shaped auxiliary chamber 32 which communicates with the communicating hole 7 of the operation plate 8, and an annular passage 33 which communicates with the outer periphery of the auxiliary chamber 32. The driven wheel 12 also comprises four slit passages 34 which ensure communication between one and another sides thereof. Moreover, the driven wheel 12 comprises a pair of circular slots 41 in the positions corresponding to the slots 40 of the operation plate 8 so as to align with the slots 40 when connecting the driven wheel 12 to the cover 23 through the screws 28.

The recess 31 is formed in annulus, and receives the caulked-joint portion 27 when the driven wheel 12 is disposed adjacent to the operation plate 8, which allows the driven wheel 12 to be in close contact with one side of the operation plate 8 for assemblage.

Figure 6:
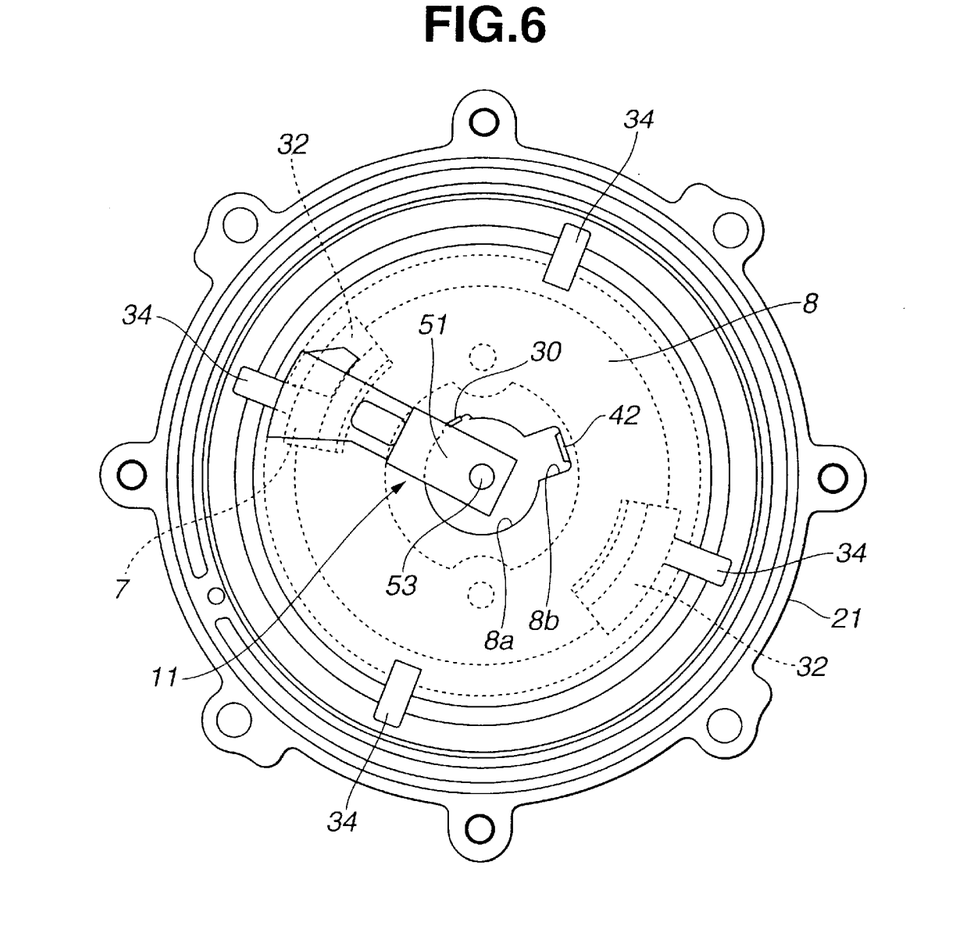
FIG. 6 is a view similar to FIG. 5, showing the apparatus as viewed from arrow VI.

The auxiliary chamber 32 is circumferentially formed roughly in rectangle as shown in FIGS. 5–6, and is arranged to correspond to the communicating hole 7 of the operation plate 8 when the driven wheel 12 is mounted to one side of the operation plate 8. The auxiliary chamber 32 has a required spatial volume which is sufficient to prevent a flow resistance when supplying working fluid out of the communicating hole 7 to the torque-transfer part 10. A circumferential width $W_1$ of the auxiliary chamber 32 is larger than a width $W_2$ of the communicating hole 7 as indicated by broken line in FIG. 5.

The annular passage 33 is formed in circular groove, and has an outer peripheral surface 33a along which working fluid flowing into the auxiliary chamber 32 through the communicating hole 7 transfers.

The slit passages 34 are circumferentially equidistantly arranged with the annular passage 33 as shown in FIGS. 4–5, and serves to bring working fluid coming along the outer peripheral surface 33a of the annular passage 33 to another side of the driven wheel 12 roughly equally for every 90° C.

Figure 7:
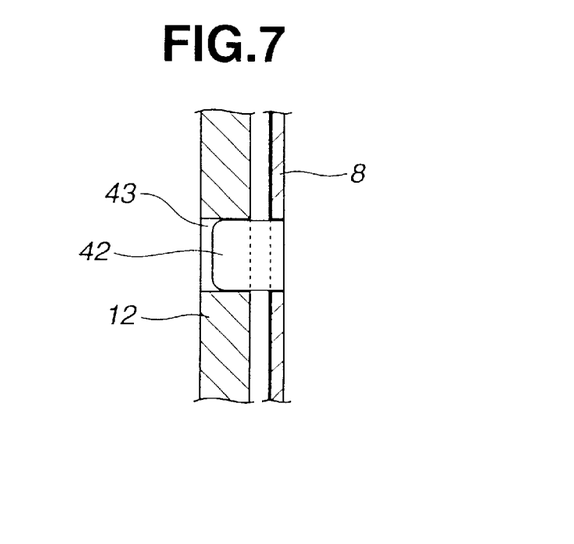
FIG. 7 is a sectional view taken along the line VII—VII in FIG. 4 and showing a positioning mechanism.

As best seen in FIGS. 1, 4 and 7, the positioning mechanism 15 includes a protrusion or engaging portion 42 arranged at an edge of a rectangular hole 8b continuously formed with the through hole 8a of the operation plate 8 and extending in the direction of the rotor 9, and a groove or engaged portion 43 formed at an inner peripheral edge of a window hole 12a formed through the driven wheel 12 in the center thereof. Another groove 43 is arranged symmetrically with respect to a center of the driven wheel 12.

Next, operation of the fluid coupling 1 will be described. During engine stop, working fluid is accumulated in the storage chamber 5, the working chamber 6, and a fluid space on the back of the rotor 9 at the same level.

With engine start, the drive shaft 2 and the rotor 9 are rotated by the crankshaft. When an ambient temperature of the housing 4 is low, the communicating hole 7 of the operation plate 8 is closed through the valve mechanism 11 to interrupt circulation of working fluid. This reduces a flow rate of working fluid supplied to the torque-transfer part 10 to lower torque transmitted from the rotor 9 to the housing 4, interrupting rotation of the cooling fan.

On the other hand, when an ambient temperature of the housing 4 rises, the communicating hole 7 of the operation plate 8 is opened through the valve mechanism 11. Thus, working fluid within the storage chamber 5 flows into the auxiliary chamber 32, and circulates along the outer peripheral surface 33a of the annular passage 33, which is supplied to the torque-transfer part 10 through the four slit passages 34. This increases torque transmitted from the rotor 9 to the housing 4 to rotate the cooling fan at high speed, obtaining full cooling of the engine radiator.

Working fluid flowing from the storage chamber 5 to the auxiliary chamber 32 through the communicating hole 7 runs smoothly in the direction of the annular passage 33 with a flow resistance reduced due to relatively large spatial volume of the auxiliary chamber 32. Therefore, quick supply of working fluid is ensured to the torque-transfer part 10, resulting in smooth and quick torque transfer from the rotor 9 to the housing 4.

For circumferential positioning of the operation plate 8 with respect to the cover 23 of the housing 4 before caulked joint, i.e. circumferential positioning with the communicating hole 7 fully closed by the valve plate 51 through the stopper 30, first, the outer periphery of the operation plate 8 is engaged with an annular groove formed at the outer periphery of the cover 23. With the slots 40 corresponding to the female-screw holes 29a, the screws 28 are softly tightened to hold the operation plate 8 temporally. Then, the operation plate 8 is rotated little by little in a predetermined circumferential direction through the slots 40 to a desired position, where caulking is carried out. This results in improvement not only in flexibility of a positional relationship between the operation plate 8 and the valve plate 51, but in opening/closing control accuracy of the communicating hole 7 through the valve plate 51.

For assemblage of the operation plate 8 and the driven wheel 12 to the housing 4, first, the operation plate 8 is joined to the cover 23 in a caulked way as described above. When the driven wheel 12 is disposed adjacent to the operation plate 8, the positioning mechanism 15 is operated to have the protrusion 42 engaged with the groove 43 from above, allowing circumferential positioning of the operation plate 8 and the driven wheel 12, i.e. accurate positioning of the communicating hole 7 and the auxiliary chamber 32. This results not only in improved assembling efficiency, but in stabilized flowability of working fluid from the communicating hole 7 to the auxiliary chamber 32 due to constant preservation of a relative position between the two, obtaining stable operating characteristics of the housing 4.

Since two grooves 43 are arranged to be roughly symmetric with respect to the center of the driven wheel 12, desired one can be selected for positioning of the driven wheel 12, facilitating assemblage thereof.

When the driven wheel 12 is disposed adjacent to the operation plate 8 as previously fixed through the positioning mechanism 15, the slots 41 of the driven wheel 12 correspond to the slots 40 of the operation plate 8, obtaining secure engagement of the screws 28 with the female-screw holes 29a through the slots 41, 40. No inconvenience occurs to fixing of the driven wheel 12 by the screws 28.

Figure 8:
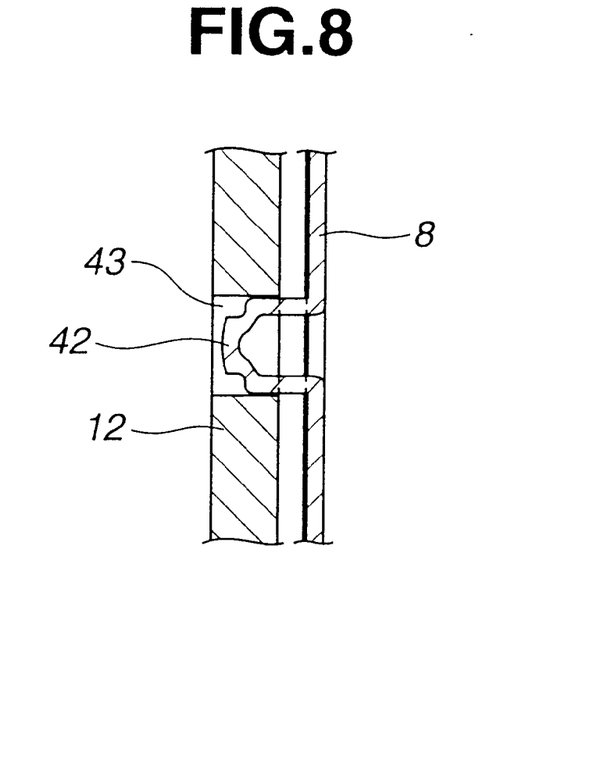
FIG. 8 is a view similar to FIG. 7, showing another example of the positioning mechanism.
Figure 9:
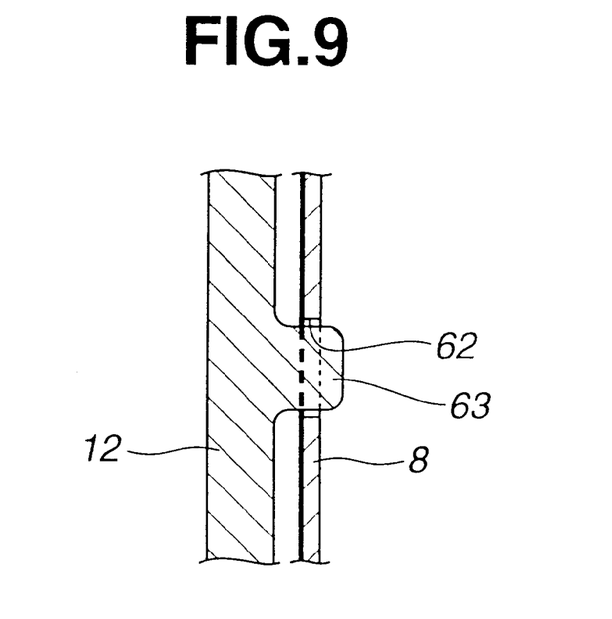
FIG. 9 is a view similar to FIG. 8, showing still another example of the positioning mechanism.

Referring to FIGS. 8–9, there are shown other examples of the positioning mechanism 15. The example as shown in FIG. 8 includes the protrusion or engaging portion 42 obtained by deforming part of the operation plate 8 in small-diameter cylinder through press working. The example as shown in FIG. 9 includes a positioning hole or engaged portion 62 formed in the operation plate 8, and a corresponding protrusion or engaging portion 63 formed with the driven wheel 12 through casting. In such a way, the positioning mechanism 15 may be in various forms and of simple structure, resulting in easy achievement thereof.

Having described the present invention with regard to the preferred embodiments, it is noted that the present invention is not limited thereto, and various changes and modifications can be made without departing from the scope of the present invention.

The entire contents of Japanese Patent Application P11-180740 are incorporated hereby by reference.

What is claimed is:

1. A fluid coupling, comprising:

a drive shaft;

a housing relatively rotatably supported to said drive shaft;

an operation plate arranged in said housing, said operation plate defining first and second chambers, said operation plate having a communicating hole for fluid communication between said first and second chambers;

a driven wheel arranged adjacent to said operation plate;

a rotor arranged in said second chamber, said rotor being fixed to said drive shaft;

a torque-transfer part interposed between outer peripheries of said driven wheel and said rotor, said torque-transfer part transmitting torque of said rotor to said housing;

a valve mechanism which opens and closes said communicating hole of said operation plate in accordance with an ambient temperature of said housing, said valve mechanism adjusting a flow rate of working fluid flowing from said first chamber to said second chamber;

a passage formed through said driven wheel, said passage bringing working fluid out of said communicating hole to said torque-transfer part;

an auxiliary chamber arranged between said driven wheel and said operation plate, said auxiliary chamber bringing working fluid out of said communicating hole to said passage; and a positioning mechanism arranged between said operation plate and said driven wheel, said positioning mechanism ensuring circumferential positioning of said operation plate and said driven wheel.

2. The fluid coupling as claimed in claim 1, wherein said positioning mechanism comprises an engaging portion arranged at an inner periphery of said operation plate and extending in an axial direction of said drive shaft, and an engaged portion arranged with said driven wheel and engaged with said engaging portion in said axial direction of said drive shaft.

3. The fluid coupling as claimed in claim 1, further comprising another positioning mechanism arranged between said operation plate and said driven wheel.

4. The fluid coupling as claimed in claim 1, wherein said operation plate is formed with a pair of slots for adjusting a circumferential position of said operation plate with respect to said valve mechanism.

5. The fluid coupling as claimed in claim 4, wherein said drive plate is formed with a pair of slots corresponding to said pair of slots of said operation plate.

6. A fluid coupling, comprising:

a drive shaft;

a housing relatively rotatably supported to said drive shaft;

an operation plate arranged in said housing, said operation plate defining first and second chambers, said operation plate having a communicating hole for fluid communication between said first and second chambers;

a driven wheel arranged adjacent to said operation plate;

a rotor arranged in said second chamber, said rotor being fixed to said drive shaft;

a torque-transfer part interposed between outer peripheries of said driven wheel and said rotor, said torque-transfer part transmitting torque of said rotor to said housing;

a valve mechanism which opens and closes said communicating hole of said operation plate in accordance with an ambient temperature of said housing, said valve mechanism adjusting a flow rate of working fluid flowing from said first chamber to said second chamber;

a passage formed through said driven wheel, said passage bringing working fluid out of said communicating hole to said torque-transfer part;

means, arranged between said driven wheel and said operation plate, for bringing working fluid out of said communicating hole to said passage; and means, arranged between said operation plate and said driven wheel, for ensuring circumferential positioning of said operation plate and said driven wheel.

\* \* \* \* \*